US010399779B2

(12) United States Patent
Fenile et al.

(10) Patent No.: US 10,399,779 B2
(45) Date of Patent: Sep. 3, 2019

(54) CARRIAGE FOR A CONVEYOR, IN PARTICULAR FOR A GRAVITY CONVEYOR, CONVEYING SYSTEM, AND METHOD FOR OPERATING A CONVEYING SYSTEM

(71) Applicant: FERAG AG, Hinwil (CH)

(72) Inventors: Roberto Fenile, Wetzikon (CH); Erich Kaelin, Rapperswil (CH)

(73) Assignee: FERAG AG, Hinwil (CH)

( * ) Notice: Subject to any disclaimer, the term of this patent is extended or adjusted under 35 U.S.C. 154(b) by 249 days.

(21) Appl. No.: 15/506,056

(22) PCT Filed: Aug. 20, 2015

(86) PCT No.: PCT/EP2015/069157
§ 371 (c)(1),
(2) Date: Feb. 23, 2017

(87) PCT Pub. No.: WO2016/030275
PCT Pub. Date: Mar. 3, 2016

(65) Prior Publication Data
US 2018/0215547 A1    Aug. 2, 2018

(30) Foreign Application Priority Data
Aug. 27, 2014 (CH) ....................... 1287/14

(51) Int. Cl.
*B65G 9/00* (2006.01)
*B65G 17/20* (2006.01)
(Continued)

(52) U.S. Cl.
CPC .............. *B65G 9/002* (2013.01); *B65G 17/20* (2013.01); *B65G 19/025* (2013.01); *B65G 39/12* (2013.01)

(58) Field of Classification Search
CPC ........ B65G 17/00; B65G 17/20; B65G 19/00; B65G 19/02; B65G 19/025; B65G 9/00; B65G 39/12
See application file for complete search history.

(56) References Cited

U.S. PATENT DOCUMENTS 3,012,519 A * 12/1961 Bingham ................ B61B 13/04
                                                     104/119
3,338,179 A * 8/1967 Klemm .................. B61B 10/025
                                                     101/112
(Continued)

FOREIGN PATENT DOCUMENTS

CH        680 922 A5    12/1992
CN     101844149 A       9/2010
(Continued)

OTHER PUBLICATIONS http://www.ferag.com/en/1033/Buffering.htm, "Buffering," Screenshot, System for Buffering Goods, © 2017, Ferag AG, Hinwil, Switzerland (3 pages).

*Primary Examiner* — Jason C Smith
(74) *Attorney, Agent, or Firm* — Pauley Erickson & Kottis (57) ABSTRACT

A carriage for a conveyor comprising a carriage body which is configured for embracing a running rail and which comprises a first and a second leg which are connected by a connection portion, wherein the first leg has first rollers which are attached to the internal side of the first leg, and the second leg has second rollers which are attached to the internal side of the second leg, and the connection portion has third rollers which are attached to the internal side of the connection portion, it is provided according to the invention that the first and the second rollers are vertically disposed, and the third rollers are horizontally disposed.

21 Claims, 6 Drawing Sheets (51) Int. Cl.
*B65G 19/02* (2006.01)
*B65G 39/12* (2006.01)

(56) References Cited

U.S. PATENT DOCUMENTS

| | | | | |
|---|---|---|---|---|
| 3,715,991 | A * | 2/1973 | Boyd | B64F 3/02 104/119 |
| 4,248,157 | A * | 2/1981 | Evans | B61B 1/005 104/246 |
| 4,531,460 | A * | 7/1985 | Pamer | B61B 13/04 104/107 |
| 4,973,219 | A * | 11/1990 | Brickner | B65G 63/004 104/88.05 |
| 2017/0275826 | A1* | 9/2017 | Fenile | E01B 25/24 |
| 2018/0215547 | A1* | 8/2018 | Fenile | B65G 17/20 |

FOREIGN PATENT DOCUMENTS

| | | |
|---|---|---|
| CN | 201 777 248 U | 3/2011 |
| DE | 33 47 842 A1 | 4/1985 |
| DE | 39 10 542 C1 | 8/1990 |
| DE | 92 04 955 U1 | 6/1992 |
| DE | 10 2006 056 943 A1 | 6/2008 |
| DE | 10 2006 058 422 A1 | 6/2008 |
| EP | 0 291 622 A2 | 11/1988 |
| EP | 0 713 834 A2 | 5/1996 |
| EP | 0 856 480 A1 | 8/1998 |
| EP | 1 693 322 A1 | 8/2006 |
| FR | 23 231 256 A5 | 12/1974 |
| JP | S60 132971 U | 9/1985 |
| JP | H03 95021 A | 4/1991 |
| JP | H03 91405 U | 9/1991 |
| JP | H04 342657 A | 11/1992 |
| WO | WO 2013/135918 | 9/2013 |
| WO | WO 2014/153675 A1 | 10/2017 |

* cited by examiner

CARRIAGE FOR A CONVEYOR, IN PARTICULAR FOR A GRAVITY CONVEYOR, CONVEYING SYSTEM, AND METHOD FOR OPERATING A CONVEYING SYSTEM

BACKGROUND OF THE INVENTION

Field of the Invention

The present invention relates to the conveying of wares. Said present invention relates to a carriage for a conveyor, in particular for a gravity-type conveyor, to a conveyor system, in particular a gravity-type conveyor system, and to a method for operating a conveyor system, in particular a gravity-type conveyor system.

Discussion of Related Art

In the case of producing and post-processing of goods, as well as in the case of picking and packing orders, automated conveying of wares plays an important role. Gravity-type conveyors, in particular gravity-type suspended conveying systems herein are distinguished inter alia in that the former enable conveying of wares to be repositioned from the floor to otherwise non-utilized spaces within our without buildings. Suspended conveyor installations are therefore often fastened overhead on supports which are attached to the ceiling, to walls, or to individual pillars which are fastened to the floor.

Moreover, suspended conveyor-systems are used as a buffer between two or more work processes of dissimilar speeds. On account thereof, networked processes may be decoupled in terms of time and/or space, thus enabling disruptions in processes to be remedied without having to stop the remaining parts of a process chain, for example. Differences in the cycle times in processing may be likewise absorbed in this way.

In many sectors, gravity-type suspended conveyors are particularly suitable for building up buffers. This is based on the better utilization of space, as has already been mentioned, on the one hand. On the other hand, said suspended conveyors are relatively energy-saving, since the latter as opposed, for instance, to actively conveyed suspended conveyor systems do not require any drive means such as drive chains, for example, which are routed along the running rails, and often have only a few short actively conveyed sections. On account thereof, gravity-type suspended conveyors may also be decreased or increased in size in a targeted, relatively simple and cost-effective manner, so as to be adapted to changed production requirements.

It is important for the safe operation of gravity-type suspended conveyors that the transportation units (also referred to as trolleys) used have consistently good running properties. In particular, it has to be ensured that transportation units are not inadvertently slowed down or even stopped on sections of the track where conveying is by gravity, since this would lead to delays or interruptions in conveying. Therefore, carriages having wheels or rollers are most often used as transportation units for gravity-type suspended conveyors, since the former generally have less kinetic resistance than those having so-called runners which in turn have a kinetic resistance that is speed-dependent.

Various types of carriage in which the wheels or rollers are developed with a view to the stresses that arise during conveying are known in the prior art.

A rail-conveyed conveying means including a conveyor truck having at least one first, second, and third castor, along a rail track is described inter alia in the as yet unpublished international patent application PCT/CH2014/000032 of the present applicant, which was filed on Mar. 19, 2014. The rotation planes of the at least first, second, and third castor herein are to be disposed at an angle of more than 0° and less than 180° in relation to one another. In order to avoid a tilting torque in the conveying direction of the conveyor trucks which are moved in a mutually independent manner along a conveying path, an arrangement having two or more first, second, and/or third castors is provided. A conveyor installation having such conveying means is likewise described. A system for buffering goods during production, which is associated with the mentioned international patent application, is shown by the present applicant on the internet (http://www.ferag.com/en/1033/Buffering.htm). This system is suitable for a multiplicity of applications. However, in the case of certain applications it may be necessary for the carriages, the rail type, and the rail profile to be specially adapted to the conveyed goods in order for an optimum result to be obtained.

EP 0 856 480 A1 describes a rail-guided transportation means, in particular for conveying print products, and a transportation installation having transportation means of this type. The transportation means comprises a plurality of wheels which are borne on two sides by a guide rail. Herein, movements that are transverse to the conveying direction are said to be prevented by means of a wheel flange which is attached to the wheels. A transportation means according to the description is to be mounted and guided on the guide rail in a largely clearance-free manner by way of wheels that are disposed in a mutually offset manner or by way of anti-friction means.

U.S. Pat. No. 4,531,460 shows a material transportation system which is also suitable for transporting goods having a great weight in a suspended manner. Supports which comprise at least two mechanically connected support heads are described. Herein, one head may serve as a drive head, and the second head may serve as an idler head. The two support heads each have support wheels which run on horizontal running faces of a support rail. The support heads additionally have comparatively small guide rollers which rotate about vertically disposed axes. The supports herein are constructed from a relatively large number of components. Moreover, said supports are unable to absorb torques that are transverse to the running direction but only such torques about axes that are parallel with the running direction and such torques about axes that are vertically perpendicular to the running direction.

EP 0 291 622 B1 shows a rail for guiding a drive chain in a conveyor belt system for handling individual objects, by way of which the objects are movable on selectable paths. The rail is said to comprise a plurality of prefabricated modules which are releasably interconnected, wherein each module forms a portion having a square cross section. According to the publication it is provided that the modules are composed of straight and curved modules, wherein there is only one type of curved module, the curvature radius of the curved modules being determined by the smallest curve radius of the drive chain being used. A guide matching the respective drive chain is disposed on each module on each of the four sides thereof. In this way, ascending or descending paths and curves may be produced using the one type of curved module in that the latter is rotated and the drive chain is obviously disposed in the respective vertical, downwardly directed guide. As shown, the guides that are not occupied by the drive chain are said to serve for receiving connectors of a plurality of modules, for instance.

It has emerged that in the case of the previous systems in which the carriages have to move section by section in a self-propelling manner driven by gravity, obstructions to the running of the trucks principally arise there where the running path comprises spatial curves. Such obstructions which also depend on the type of the transported goods may significantly compromise the operation of such a conveyor system.

SUMMARY OF THE INVENTION

It is therefore an object of the invention to provide a carriage having positive running characteristics, in particular for a gravity-type conveyor installation. Such a carriage is intended to be suitable for goods of dissimilar dimensions and/or masses, and for conveying paths having almost any track profile.

It is a further object of the invention to provide a carriage which is manufacturable at a relatively low unit cost.

A further object of the invention lies in providing a functionally reliable and simple conveyor system, in particular a gravity-type conveyor system.

A further object of the invention is to provide an advantageous method for operating such a conveyor system.

These and further objects are achieved by the claimed invention. Design embodiments of the invention are derived from the dependent claims.

The carriage according to the invention for a rail-guided conveyor system, in particular a gravity-type conveyor, comprises:

a) a carriage body which is configured for embracing a running rail and which comprises a first and a second leg which are interconnected by a transversely extending connection portion, wherein b) the first leg has first rollers which are attached to the internal side of the former, and c) the second leg has second rollers which are attached to the internal side of the former, and d) the connection portion has third rollers which are attached to the internal side of the former.

Said carriage according to the invention is characterized in that e) the first and the second rollers are vertically disposed, and f) the third rollers are horizontally disposed.

In a state of being fitted to a running rail, a carriage may at least at times also be rotated such that in the case of such a rotation by 90°, for example, the first and the second rollers may be at times horizontally disposed, and the third rollers may be at times vertically disposed.

One design embodiment of the carriage is distinguished in that the carriage in the cross-sectional profile is configured so as to be U-shaped.

A carriage according to the invention may be used for a gravity-type suspended conveyor. However, by virtue of the particular properties thereof, a carriage according to the invention may not only be attached to a running rail in a suspended manner. In the case of a respective orientation of a running rail, a design embodiment of the carriage according to the invention may also run vertically on or laterally on a running rail. Intervening orientations are also possible.

One design embodiment of the carriage according to the invention is distinguished in that means for conveying objects in a suspended or carried/supported manner are attached to the connection portion. A carriage may thus be at least at times located above, beside, or below an object that is being conveyed by the former.

In one design embodiment of the carriage according to the invention, said carriage as means for conveying objects in a carried/supported manner comprises a plate which is attached to the connection portion. Such a plate may be an individual plate. However, such a plate may also be an arrangement of a plurality of plates which are attached to one and/or to a plurality of carriages, as will be discussed in more detail at a later stage.

Another design embodiment of the carriage according to the invention is characterized in that the first and the second rollers are disposed in a mirror-symmetrical manner to a vertical symmetry plane of the carriage.

A further design embodiment of the carriage according to the invention is characterized in that the rotation axes of the third rollers lie in the vertical symmetry plane of the carriage.

Yet another design embodiment of the carriage according to the invention is characterized in that the first and the second rollers and the third rollers each are provided in pairs, wherein the rollers of each pair are disposed sequentially in the running direction of the carriage.

In particular, the rotation axes of respectively assigned roller pairs may have identical mutual spacing.

Another design embodiment of the carriage according to the invention is characterized in that the rotation axes of the rollers of a first set of rollers, comprising a first and a second and a third roller, lie in a first plane, and the rotation axes of the rollers of a second roller set, likewise comprising a first and a second and a third roller, lie in a second plane, wherein the first plane lies parallel with the second plane.

It has been demonstrated that a particularly accurate and reliable guidance may be achieved by means of such an arrangement of two roller sets in the case of certain applications. In particular, it may thus be ensured that no canting may take place between rollers and the running rail even in the case of tight curvatures in the trajectory of a conveyor section. It may also be ensured in this way that the carriage does not start to inadvertently roll and/or vibrate. Uniform stressing of the rollers and a smooth travel of the carriage may thus be achieved.

A further design embodiment of the carriage according to the invention is characterized in that the first and the second rollers have a diameter from 10 to 50 mm and a width from 5 to 25 mm.

Another design embodiment of a carriage according to the invention is distinguished in that said carriage comprises a first roller set having a first, a second, and a third roller which all have the same diameter and the same width. The rotation axes of the rollers of the first roller set herein lie in a first plane. Such a design embodiment of a carriage is likewise distinguished in that said carriage comprises a second roller set having a first, a second, and a third roller which all have the same diameter and the same width. The rotation axes of the rollers of this second roller set herein lie in a second plane. In the case of such a design embodiment of a carriage the first plane lies parallel with the second plane and is spaced apart therefrom. It has been demonstrated that particularly reliable conveying may be achieved even on conveying sections having very tightly curved trajectories by way of such a design embodiment of a carriage according to the invention.

Another design embodiment of the carriage according to the invention is characterized in that the third rollers and the first and the second rollers have the same dimensions. This may be advantageous in order to reduce the number of different components of a carriage, on account of which the manufacture of the latter may be simplified, on the one hand, and by virtue of the simplified stock-keeping thus enabled may also be more cost-effective.

Yet another design embodiment of the carriage according to the invention is characterized in that the second rollers, and/or the first and the second rollers are each configured to comprise a roller body being injection-moulded around a ball bearing.

A further design embodiment of the carriage according to the invention is characterized in that the first and the second rollers and the third rollers are releasably fastened to the carriage body, in particular are screwed to the carriage body. On account thereof, a simplified replacement of defective rollers is possible, for example. However, other types of connections are also conceivable.

Another design embodiment of the carriage according to the invention is characterized in that the carriage body is integrally configured.

Yet another design embodiment of the carriage according to the invention is characterized in that the carriage has at least one coupling element for the at least temporary coupling to a device for accelerating or for uniformly moving or for braking the carriage, said coupling element being disposed so as to outwardly protrude on the first or the second leg or on the connection portion.

In particular, the first and the second rollers each are provided in pairs, wherein the rollers of each pair are disposed sequentially in the running direction of the carriage, the at least one coupling element being disposed between the rotation axes of the first or the second rollers. Such an arrangement may be advantageous for minimizing tilting torques that arise in the case of a collision of two carriages. Furthermore, the carriage may have two coupling elements which are disposed in a mirror-symmetrical manner to the vertical symmetry plane.

A further design embodiment of the carriage according to the invention is characterized in that the carriage has at least one elastically deformable buffer body for buffering any contact with a second carriage, said buffer body outwardly protruding from the carriage body in a running direction of the carriage. In particular, the carriage may have at least one central buffer body which is centrally attached to the connection portion. On account thereof, damage in the case of a collision between connection portions of sequential carriages may be avoided, for example. This may be advantageous in the case of running rails having a continuously decreasing incline, for example.

Another design embodiment of the carriage according to the invention is characterized in that the carriage has coupling means by way of which the former may be connected to at least one other carriage. On account thereof, a linked carriage assembly may be formed. Such linked carriage assemblies may comprise few carriages (2, 3, or more, for example) or else a multiplicity of such carriages (10, 20, or more, for example), depending on the field of application. Likewise, such linked carriage assemblies may also be endless (closed) chains or quasi-endless (very long) chains, as will be explained in more detail at a later stage.

Depending on the field of application of the carriages, the latter may be releasably or non-releasably connected to the coupling means.

Coupling means may be mechanical coupling means, hooks and eyelets, universal joints or ball joints, for example, or else be magnetic coupling means or adhesively bonded connections, for example.

A connection between carriages that is performed by such coupling means may be rigid in angular terms, or else be articulated so as to guarantee the required mobility of the individual carriages in the case of travel on curves, for instance. The connection may also comprise additional elements such as connection bars, springs, or sprung damper elements, so as to set the kinematic coupling of connected carriages in a targeted manner to a specific application, for example.

In particular, the carriage may have at least one elastically deformable buffer body for buffering any contact with a second carriage, said buffer body outwardly protruding from the carriage body in a running direction of the carriage, wherein the coupling means may be integrated in the buffer body. For some applications, the buffer bodies of a first carriage and of a second carriage connected to the former may be integrally configured, wherein the coupling means may, for example, be a constriction which is configured as a hinge or an articulation, respectively.

The conveyor system, in particular the gravity-type conveyor system, according to the invention comprises at least one running rail and at least one carriage according to the invention, wherein the running rail and the carriage are mutually adapted and the running rail is embraced by the carriage.

One design embodiment of the conveyor system, in particular of a gravity-type conveyor system, according to the invention is characterized in that a plurality of carriages are provided, in that some of the carriages are configured as transportation trucks and are loadable with cargo, and some of the carriages are configured as spacer trucks and are employable for ensuring a spacing between the transportation trucks.

The method according to the invention for operating a conveyor system, in particular a gravity-type conveyor system, according to the invention is characterized in that a plurality of carriages are provided, and some the carriages are loaded with cargo, and some of the carriages are empty and are employed for configuring a spacing between those carriages that are loaded with cargo.

One design embodiment of the method according to the invention is characterized in that the carriages that are loaded with cargo, and the empty carriages that are employed for configuring a spacing between the former are coupled to one another. This coupling may be releasable or non-releasable, depending on the field of application.

One design embodiment of the method according to the invention is characterized in that a plurality of carriages are linked to form at least one coupled carriage assembly. Such a carriage assembly or linked unit, respectively, may comprise between 2 and 20 carriages, for example. However, linked units having more carriages are also conceivable.

One further design embodiment of the method according to the invention is characterized in that the load of at least one conveyed item of cargo is distributed across a plurality of carriages of the at least one coupled carriage assembly. For example, this may be achieved in that an item of cargo is simultaneously mechanically connected, for example hitched, to a plurality of carriages. In this way, particularly heavy cargo may also be conveyed for example, since the stresses that arise may be distributed across the plurality of carriages.

A carriage according to the invention, in particular for a gravity-type conveyor, is suitable to a particular degree for a running rail such as is described in detail in a Swiss patent application of the present applicant that is simultaneously filed in parallel with the present Swiss patent application. In principle, however, a carriage according to the invention is not limited to being used with such running rails.

It has been demonstrated in the past in the case of certain loads that the rollers of carriages for gravity-type conveyors align themselves in relation to the running rail such that the kinetic resistance of the latter is greatly increased. On the one hand, it may occur that rollers depart from the actual running faces of a running rail and instead contact faces having a significantly higher rolling resistance.

On the other hand, it is also possible for the contact forces between the rollers and the running faces to be greatly increased, this likewise potentially resulting in a significant increase of the rolling resistance.

Likewise, a carriage by virtue of certain external forces under certain circumstances may be aligned in relation to a running rail such that jamming between the running rail and the carriage body and/or the rollers may arise, on account of which the carriage is decelerated. Conveying under certain circumstances is thus at least at times interrupted, and/or the carriage or the running rail may be damaged.

In particular in the case of gravity-type suspended conveyors, (translatory) forces in the running direction (x), horizontal forces lateral to the running direction (y), and forces in the vertical direction (z) act on a carriage, on the one hand. Besides, however, various torques which are caused in particular by incidents of acceleration of the conveyed goods, or else of the carriage per se, during transportation along the conveyor path also act on a carriage. Such incidents of acceleration mainly arise in the case of horizontal and vertical changes of direction, and in the case of braking procedures or of speed increases. Above all, tilting torques, that is to say torques about axes (y) that are aligned so as to be lateral to the running direction, have proven problematic for many rail types herein. However, depending on the goods to be conveyed and on the profile of the rail path, yaw torques, that is to say torques about axes (z) that are vertical to the running direction, may likewise become problematic. The same applies to rolling torques, that is to say torques about axes (x) that are parallel with the running direction.

A carriage according to the invention, by virtue of rollers which are disposed in a special way and are adapted to a running rail, may meet the arising forces and torques individually, or else in any arbitrary combination thereof. Jamming between the carriage and the running rail is thus reliably avoided.

To this end, a carriage according to the invention for a gravity-type conveyor comprises a carriage body which is configured for embracing a running rail. Such a carriage body has a first and a second leg which are connected by a connection portion. According to the invention, first or second rollers, respectively, are attached to the internal side of the first leg and to the internal side of the second leg. Third rollers are attached to the internal side of the connection portion.

According to the invention it is provided that the first and second rollers herein are vertically disposed, whereas the third rollers are horizontally disposed. If and when such a carriage, for instance in a gravity-type conveyor, for example a gravity-type suspended conveyor, is used, the first and the second rollers predominantly carry the stress acting in the vertical direction, that is to say serve as support rollers, whereas the third rollers predominantly serve for guiding the carriage in the horizontal direction, thus acting as guide rollers. However, the rollers may at times also change these functions and/or mutually swap the latter, as will be explained in more detail at a later stage. This may be the case, for example, when incidents of acceleration arise transversely to the running direction in curved portions, or when the running rail is rotated about the longitudinal axis thereof.

Herein, carriages according to the invention display particularly good properties when the former are used in combination with running rails which dispose of surfaces which are substantially horizontal, parallel and mutually opposed, and which may serve as running faces for the support rollers, and moreover dispose of surfaces which are substantially vertical, parallel and mutually opposed, and which may serve as running faces of the guide rollers.

Means for conveying cargo (tubes, bottles, cartons, boxes, etc.) may be attached to the connection portion of a carriage. This conveying may be performed in a suspended or carried (or supported, respectively) manner for example. However, in the context of the invention it is also possible for the carriage for certain reasons to not have such means, as will be explained in more detail at a later stage.

The guide rollers, on the one hand, serve for guiding the carriage such that the running direction of the latter is substantially congruent with that of the running rail. This is performed in that the third rollers as guide rollers in curved portions absorb the centripetal forces that act from the running rail laterally on the running bodies, for example, on account of which the carriage is redirected. Herein, the third rollers at the same time restrict yaw movements such as the maximum possible rotation of the carriage about a vertical axis (z) in relation to the running rail. Consequently, the running direction of the truck cannot deviate from that of the running rail by more than a predetermined measure. It is thus as the same time prevented that the first and the second rollers which at least partially act as support rollers come into contact with parts of the running rail that are not running faces. On the other hand, the friction between the rollers and the running faces is also reduced in this way. The first and the second rollers herein also serve for absorbing yaw torques which act on the carriage.

The first and the second rollers of the carriage serve for transmitting the weight of a conveyed goods item, and also that of the running body, to the running rail, on the one hand.

Additionally, the first and the second rollers also limit the tilting movements of a carriage in relation to the running rail, such as arise for instance in the case of descending track portions. This is performed in that tilting is possible only to the extent to which a forward first or second roller comes into contact with an upper running face of the running rail, and a rearward first or second roller is in contact with a lower running face. Tilting torques may be transmitted to the running rail in this way, without the rolling resistance being critically increased. It is likewise prevented by such a limitation of tilting movements according to the invention that the first and the second rollers come into contact with regions of the running rail that are not running faces.

Furthermore, the first and the second rollers also limit rolling movements of the carriage in relation to the running rail, such as may arise in curved portions, for instance. In the case of pure rolling torques a rolling movement which leads to the first rollers coming into contact with the upper running faces, and to the second rollers coming into contact with the lower running faces, or vice-versa, is generated. Such contacting defines a maximum rolling movement. On account thereof, the third rollers are prevented from coming into contact with parts of the running rail that are not running faces. The third rollers simultaneously still guide the carriage and prevent the first and the second rollers from coming into contact with regions of the running rail that are not running faces.

The carriage body may be integrally configured, for example, by way of which cost-effective manufacturing is optionally possible. In principle, carriage bodies according to the invention may be manufactured by various methods and from dissimilar materials. In this way, integral shaping by means of injection-moulding methods for plastics (for example polyethylene, polyurethane, or polyamide) or metals ((for example aluminium alloys or steel) is possible, for example. Likewise, carriage bodies may be manufactured from plastics reinforced with long or short fibres, wherein glass fibres or carbon fibres may be used, for example.

The use of metallic or non-metallic inserts in a carriage body is likewise possible. The latter may serve for providing threads, for attaching support means, or for fastening the support and guide rollers, for instance. Alternatively or additionally, inserts may also be used as local reinforcements in regions having a concentrated introduction of force and/or for stiffening the overall structure.

A carriage body may also be manufactured by means of bending sheet-metal panels.

Other components may also be integrated into the carriage body in particular in the case of carriage bodies which are manufactured by means of bending sheet-metal panels. In this way, coupling elements may be moulded onto the carriage body by outwardly bending sheet-metal tongues or similar, for example. The manufacturing costs may optionally be significantly reduced by such a type of functional integration.

Correspondingly bent sheet-metal parts may also be insert-moulded into plastics, or may be otherwise coated, if required. Such embodiments optionally permit cost-effective manufacturing of carriage bodies having specific visual or chemical surfaces such as are required for use in the foodstuffs industry, for instance.

A carriage body may also be manufactured by subtractive shaping, for example from a premould. In this way, a carriage body may also be manufactured from a portion of an extruded profile such as a corresponding U-profile, V-profile, or Y-profile. Herein, a plurality of such portions may also be assembled so as to form a carriage body.

The geometry of the carriage bodies may comprise additional elements which increase the strength and/or rigidity of the former. In this way, the legs and/or the connection portion may be configured so as to be shell-shaped, for example. Alternatively or additionally, reinforcement ribs may be included in particular in the region of the connection portion and of the transitions of the latter to the two legs. A carriage body may likewise have regions with an increased wall thickness.

The carriage advantageously has a plurality of coupling elements which in particular are disposed in a mirror-symmetrical manner to the vertical symmetry plane. Other arrangements are likewise possible.

Moreover, the carriage may have an optional marker by way of which the carriage and/or the cargo attached to the carriage may be unequivocally identified. An RFID tag or a visual marking such as lettering or a bar code may be used as a marker, for example. The use of a plurality of markers is likewise possible. Such markers may also be disposed in or on a coupling element.

The carriage body may advantageously also have at least me elastically deformable buffer body which outwardly protrudes in a running direction of the carriage. Such buffer bodies serve for damping shocks in the case of a plurality of carriages which are attached to one running rail colliding. To this end, the buffer body may be at least partially manufactured from an elastic or preferably an elastic-plastic material, for example. The buffer body may be an integral component part of the carriage body, or else be a discrete component that is releasably or non-releasably connected to the latter. To this end, said buffer body may have one or a plurality of pins by way which the former engages in a respective bore on the carriage body.

In the case of a carriage body that has been manufactured by bending sheet-metal, a buffer body may also be injection-moulded thereonto, on account of which a particularly simple and mechanically stressable connection between the carriage body and the buffer body may be generated, if required.

Alternatively or additionally, protrusions (for example sheet-metal tongues) which may be introduced into respective openings of buffer bodies, so as to mechanically connect the buffer bodies to the carriage body may also be attached to the carriage body. To this end, these protrusions may also have barbs which, once the introduction has been completed, counteract any separation, if required.

The conveyor system, in particular the gravity-type conveyor system, according to the invention is particularly suitable for conveying cargo having a mass between approximately, 50 grams and 30 kilograms. However, upon corresponding scaling, a conveyor system according to the invention in principle may also be used for cargo having a mass that is outside this range. During the operation of such a system, some of the carriages may be loaded with cargo, while some of the carriages remains empty, determining and maintaining a spacing between the carriages that are loaded with the cargo. In this way, cargo having comparatively large dimensions may also be conveyed without the cargo of different transportation trucks coming into mutual contact. If and when required, the maximum stress that acts per length unit on a running rail may be also be limited in a simple and reliable manner on account thereof.

Herein, one or a plurality of leading empty carriages, and/or one or a plurality of trailing empty carriages may also be coupled to a carriage that is loaded with an item of cargo, so as to form a fixed truck consist.

Likewise, a plurality of carriages may also be joined up or linked, respectively, such that the former form a chain of carriages. Conveying by a drive which is attached to the running rail may thus also be performed. The formed chain may be an endless chain (closed chain). However, the formed chain may also be a finite chain having a first and a last carriage.

BRIEF DESCRIPTION OF SEVERAL VIEWS OF THE DRAWINGS

The invention is to be explained in more detail hereunder by means of exemplary embodiments in conjunction with the appended drawings. In the drawings and in a schematic manner.

DETAILED DESCRIPTION OF THE INVENTION

Figure 1:
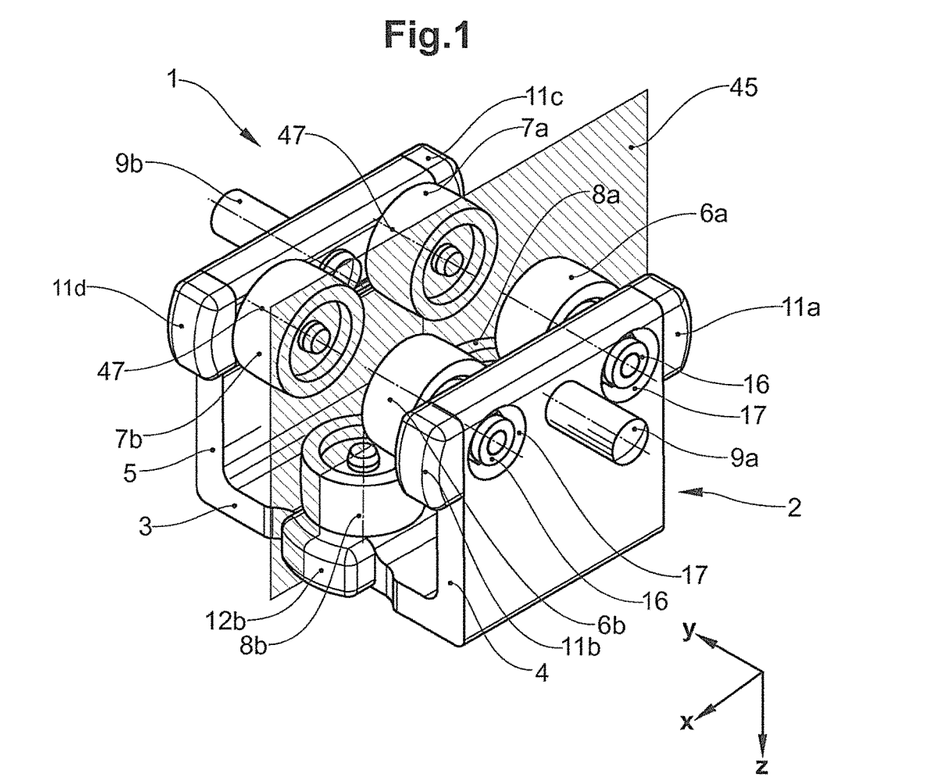
FIG. 1 shows an embodiment of a carriage for a conveyor, in particular a gravity-type conveyor, in a perspective view from above.
Figure 2:
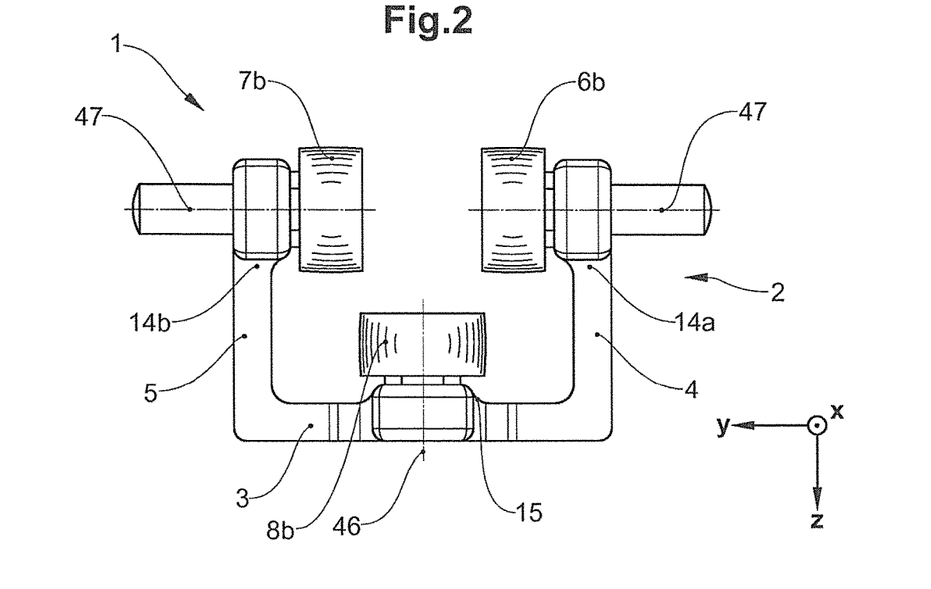
FIG. 2 shows the embodiment of FIG. 1 in a view from the front.

FIGS. 1 to 4 show various views of an embodiment of a carriage 1 for a conveyor, in particular a gravity-type conveyor. The carriage 1 shown comprises a carriage body 2 which in the cross section is U-shaped, which has (horizontal) connection portion 3 which in this embodiment is disposed below, and a first and a second (vertical) leg 4 and 5, respectively, which are laterally contiguous to said connection portion 3. On account thereof, the carriage shown is capable of embracing a running rail according to FIG. 5 and to run thereon as an external runner. In the embodiment shown, two first rollers 6a, b which act as support rollers are disposed on the internal side of the first leg 4. Two second rollers 7a, b which likewise act as support rollers are disposed on the internal side of the second leg 5. All first and second rollers each are mounted so as to be rotatable about a rotation axis 47 (FIG. 2).

Figure 3:
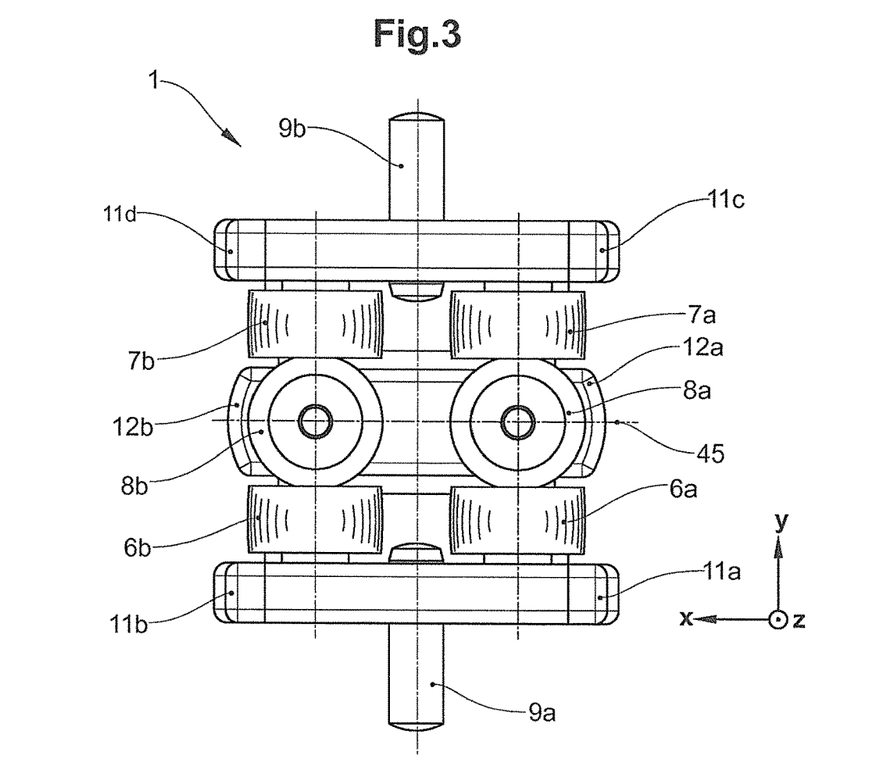
FIG. 3 shows the embodiment of FIG. 1 in a view from above.

As is shown in FIGS. 2 and 3, the rotation axes 47 of the first and of the second roller pairs 6a, b; 7a, b are aligned so as to be substantially mutually parallel (parallel with the y axis). Moreover, the first 6a, b and the second rollers 7a, b are disposed so as to be mutually mirror-symmetrical to a vertical symmetry plane 45 (parallel with the xz-plane; FIG. 3).

Two third rollers 8a, b are disposed centrically and rotatably mounted on the internal side of the connection portion 3. These third rollers act as guide rollers. The rotation axes of the third rollers 8a, b herein lie in the symmetry plane 45 (cf. FIG. 3). In the embodiment shown of a carriage 1 according to the invention, the rotation axes 46 of the two third rollers 8a, b have the same mutual spacing as the rotation axes 47 of the first and the second rollers 6a, b, 7a, b. Moreover, the guide rollers and the first and the second rollers are all of identical construction. As is shown in FIGS. 2 and 3, the rollers used moreover have slightly cambered running faces. Such a camber may reduce the rolling resistance of the rollers, in particular even if and when the carriage is rotated about an axis which is parallel with the running direction (x).

The first and the second rollers 6a, b, 7a, b each are designed as ball bearings that are injection-moulded in plastics. The axes of the rollers in the fitted state are mounted in bores which are incorporated into the carriage body. In the embodiment shown the axes are screw-fitted using nuts 16. For this purpose, recesses 17 in which the nuts 16 may be fitted in a sunken manner are attached to the external sides of the first and second legs 4, 5. On account thereof, undesirable elevations on the external faces of the legs 4, 5 are avoided.

Figure 7:
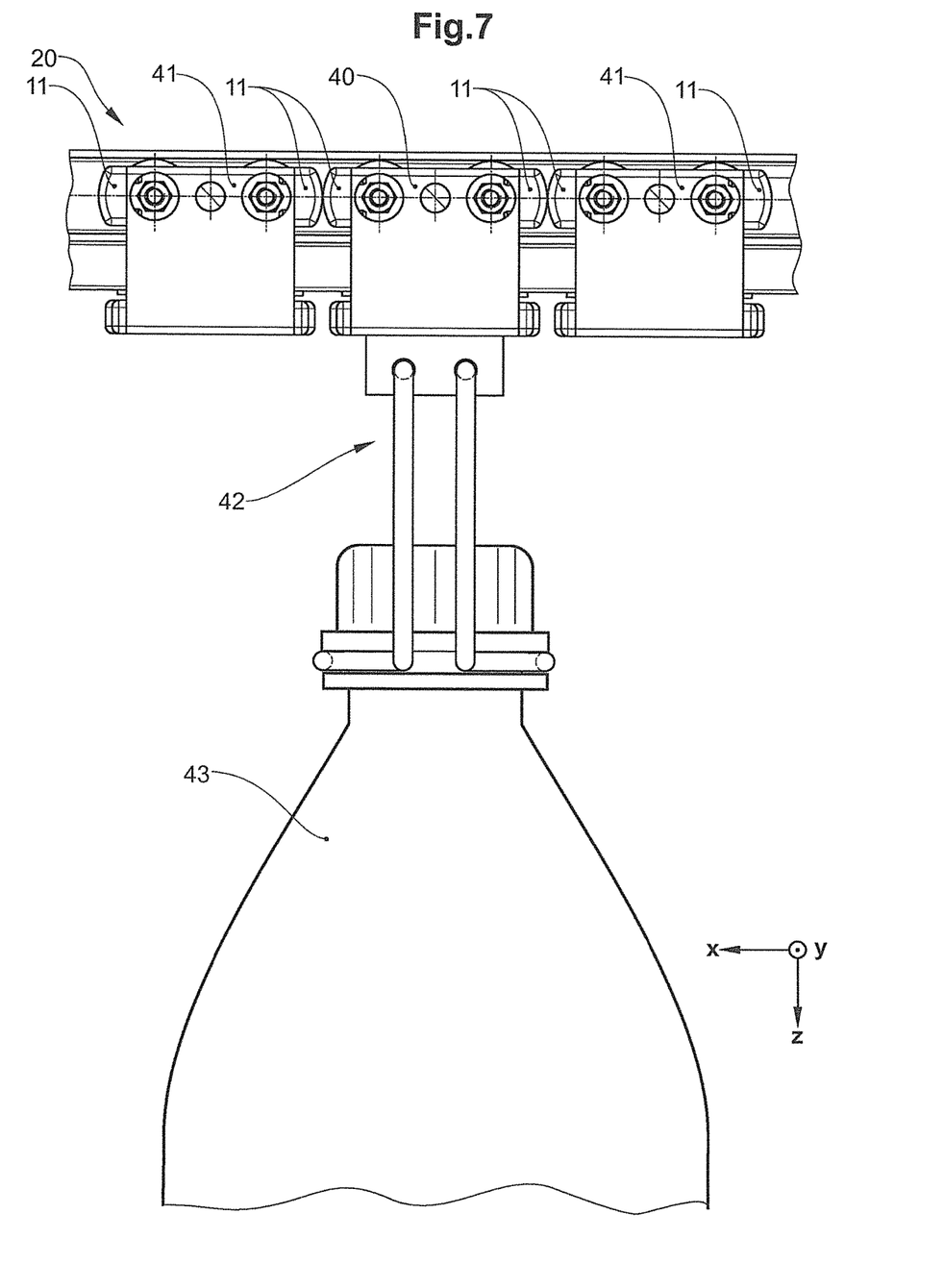
FIG. 7 is a lateral view of an assembly of three carriages according to FIG. 1, wherein the central carriage carries an item of cargo to be conveyed, while the other two carriages are unladen and serve for keeping a spacing.
Figure 8:
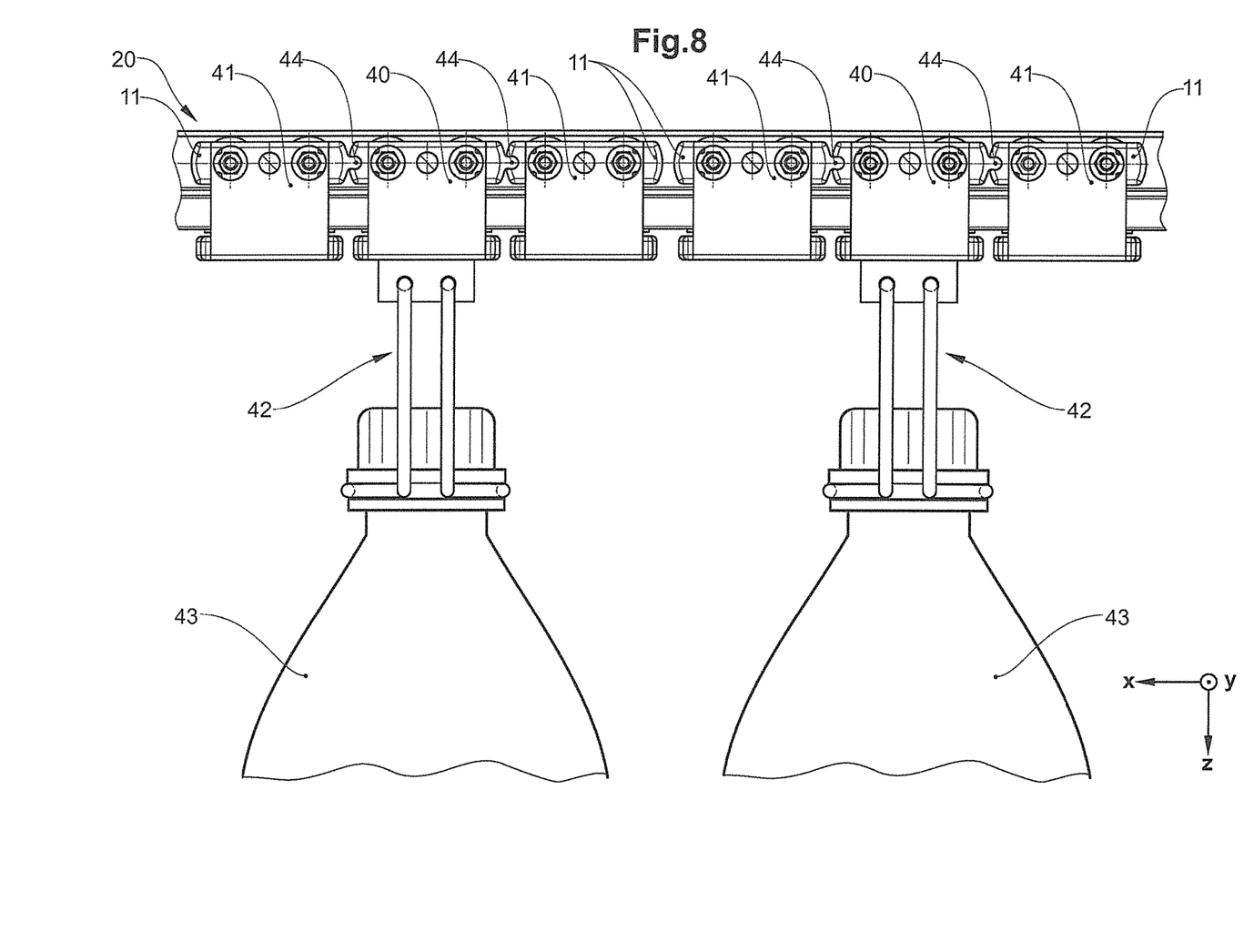
FIG. 8 in an illustration that is comparable to FIG. 7 shows an assembly of two loaded carriages which are kept at a spacing by two unladen carriages and which each are additionally combined with one unladen leading and trailing carriage.

Means for carrying cargo in a suspended manner may be attached to the (downwardly directed) external side of the connection portion 3, as will be shown at a later stage (FIGS. 7, 8).

Figure 4:
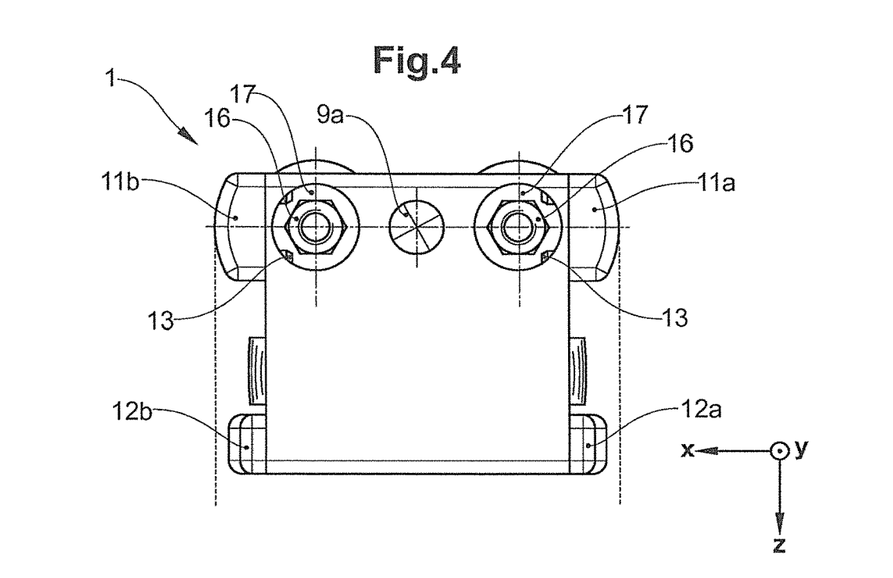
FIG. 4 shows the embodiment of FIG. 1 in a view from the side.
Figure 5:
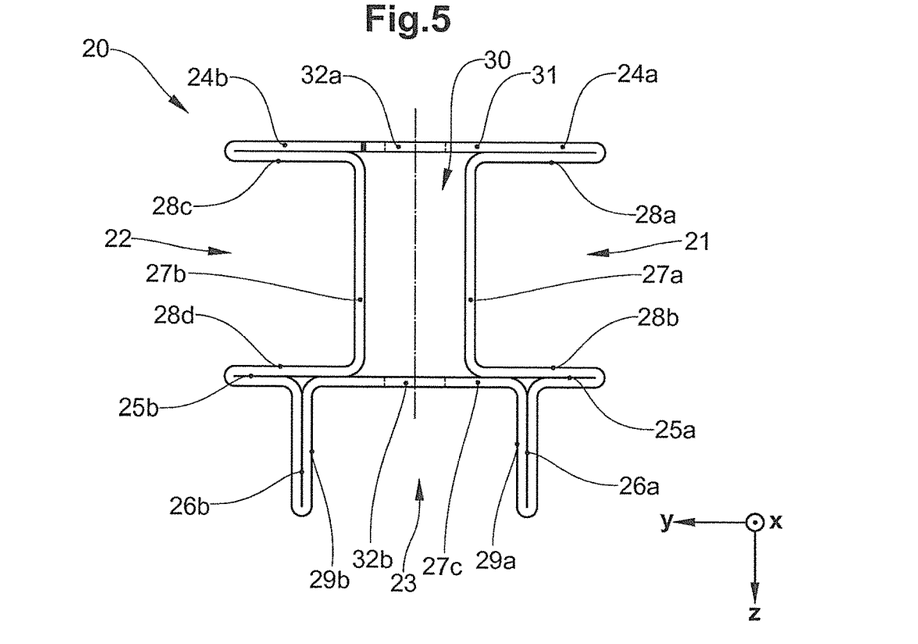
FIG. 5 shows an embodiment of a running rail for the carriage of FIG. 1 in a profile view.

Coupling elements 9a, b which laterally (y-axis) protrude (horizontally) outwards from the carriage are attached to the external sides of the first and of the second leg 4, 5 in the exemplary embodiment. These coupling elements 9a, b serve for coupling the carriage 1 to an entrainment element of a drive chain (not shown), in order to move the former upwards on an inclined section, for example. As is shown in FIG. 3, the coupling elements 9a, b (for example by a press-fit) may be fastened in through bores in the first or the second leg 4, 5, respectively, and may also partially protrude inwards beyond the internal sides of said legs 4, 5. As is shown in FIGS. 4 and 5, the coupling elements 9a, b in the embodiment shown of a carriage 1 are disposed centrically between the rotation axes of the first and the second roller pairs 6a, b, 7a, b. The central axis of the coupling elements 9a, b is moreover located at the same height (in the direction of the z-axis) as the rotation axes 47 of the first and the second rollers 6a, b, 7a, b.

The embodiment shown in the figures of the carriage 1 moreover has elastically deformable buffer bodies 11a-d which are attached to the upper region of the legs 4, 5 (cf. FIG. 1). Said buffer bodies 11a-d serve as damper elements which damp shocks when two carriages 1 which are moved in a mutually independent manner collide, for example. To this end, the buffer bodies 11a-d protrude from the carriage body 2 in the running direction (or the direction opposite to the running direction, x-axis), and are manufactured from an elastic or an elastic-plastic material. In the embodiment shown, the buffer bodies 11a-d have pins 13 which engage in respective bores on the carriage body 2, establishing a connection with the latter, as is indicated in FIG. 4. The buffer bodies 11a-d have a camber so as to prevent canting of adjacent carriages.

In addition to these upper buffer bodies 11a-d, the carriage 1 shown also disposes of lower buffer bodies 12a, b which are centrically attached to the lower connection portion 3. When viewed in the running direction (x-axis), said lower buffer bodies 12a, b are disposed so as to be recessed in relation to the upper buffer bodies 11a-d. To this end, the lower central buffer bodies 12a, b are disposed in indentations on the lower connection portion 3. These lower buffer bodies 12a, b, disposed in an offset manner, are intended to dampen shocks between the lower connection portions 3 of sequential carriages 1 on running rails having a decreasing incline.

FIG. 5 shows a potential running rail 20 for a carriage 1 according to the invention. The running rail 20 comprises first, second, and third profiled portions 21, 22, 23, each having a U-shape or a C-shape, respectively. These profiled portions are disposed such that upper horizontal legs 24a, b and lower horizontal legs 25a-b result in the overall profile of the running rail 20. These legs 24a, b, 25a, b each are connected by vertical connection portions 27a, b.

Two vertical legs 26a, b which are connected by a horizontal connection portion 27c are disposed on the lower side of the running rail 20. The internal sides of the horizontal legs 24a, b, 25a, b each are configured as horizontal running faces 28a-d for the support rollers.

The internal sides of the vertical legs 26a, b each are configured as vertical running faces 29a, b for the guide rollers.

An intermediate space 30 which on the upper side thereof is closed by a mechanical connection 31 and which extends in the longitudinal direction of the rail is located between the connection portions 27a-c.

Moreover, fastening openings 32a, b which are distributed along the running direction (x-axis) are disposed in the horizontal connection portion 27c and in the mechanical connection 31 in the running rail 20 shown. Screws for suspending a running rail 20 or for connecting a plurality of running rails 20 by means of a respective connector may be attached in such fastening openings 32a, b, for example.

Figure 6:
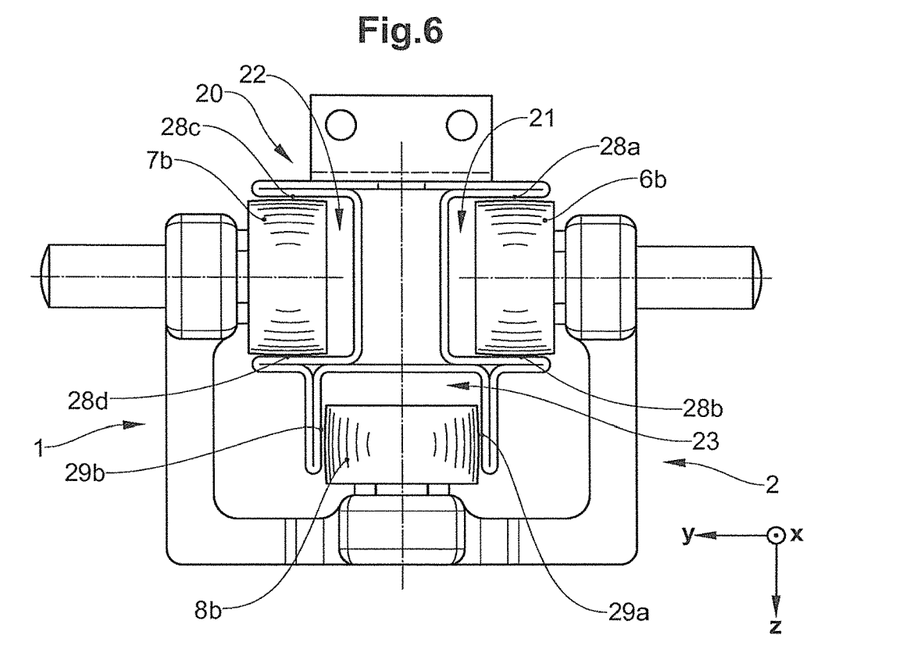
FIG. 6 shows the carriage of FIG. 1 in the running rail of FIG. 5.

It is shown in FIG. 6 how a carriage 1 according to the embodiment described to date acts as an external runner on a running rail 20. Herein, the first support rollers 6a, b are disposed in the region of the first profiled portion 21, between the upper horizontal leg 24a and the lower horizontal leg 25a. In an analogous manner, the same applies to the second support rollers 7a, b and to the second profiled portion 22. The first and the second support rollers 6a, b, 7a, b each may either be in rolling contact with a lower horizontal running face 28b, 28d on the lower side, or with an upper horizontal running face 28a, 28c on the upper side. To this end, the vertical spacing between the horizontal running faces is chosen so as to be somewhat larger than the maximum diameter of the support rollers.

The guide rollers 8a, b are disposed in the region of the third profiled portion 23, between the vertical legs, and each may be in rolling contact on one of the two vertical running faces 29a or 29b. There too, the horizontal spacing between the vertical running faces is chosen so as to be somewhat larger than the maximum diameter of the guide rollers.

By virtue of this arrangement of the rollers in relation to the running faces, such displacements or torsional movements of the carriage 1 in relation to the running rail 20, which would lead to contact between the rollers and parts of the running rail that are not running faces, are precluded. Likewise, direct contact between the carriage body 2 and the running rail 20 is prevented.

As is shown in FIG. 7, carriages in the case of a conveyor system according to the invention, in this case configured as a gravity-type suspended conveyor system, may be used both as transportation trucks 40 as well as spacer trucks 41. Transportation trucks 40 may received cargo 43 by means of support means 42. As is shown in FIG. 7, it is possible herein to have one or a plurality of spacer trucks 41 leading and/or trailing a transportation truck 40. As is shown in FIG. 7, this may be performed in a loose composition in which the transportation truck 40 and the spacer trucks 41 touch only temporarily by way of the buffer bodies 11, but otherwise move along the running rail 20 in a largely mutually independent manner.

Alternatively, transportation trucks 40 and spacer trucks 41, however, may also be joined together by way of releasable coupling means 44, so as to form a durable composition, as is shown in FIG. 8. As is shown, these coupling means 44 may be integrated into the buffer bodies 11. By way of such durable compositions of a plurality of carriages 1 it may be ensured that the latter also remain together in the case of junctions, or that the number of turnout settings may be reduced. Likewise, if required, the goods to be conveyed may be distributed across a plurality of entrainment elements of one drive chain in the case of ascending track portions.

Figure 9:
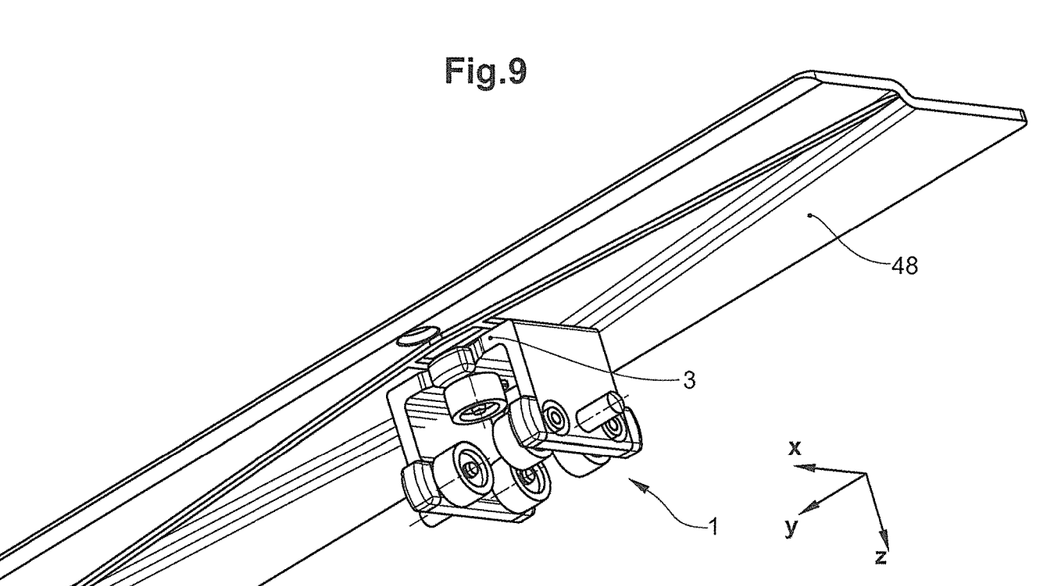
FIG. 9 shows an embodiment of a carriage as a carrying truck having a carrier plate, in a perspective view from below.
Figure 10:
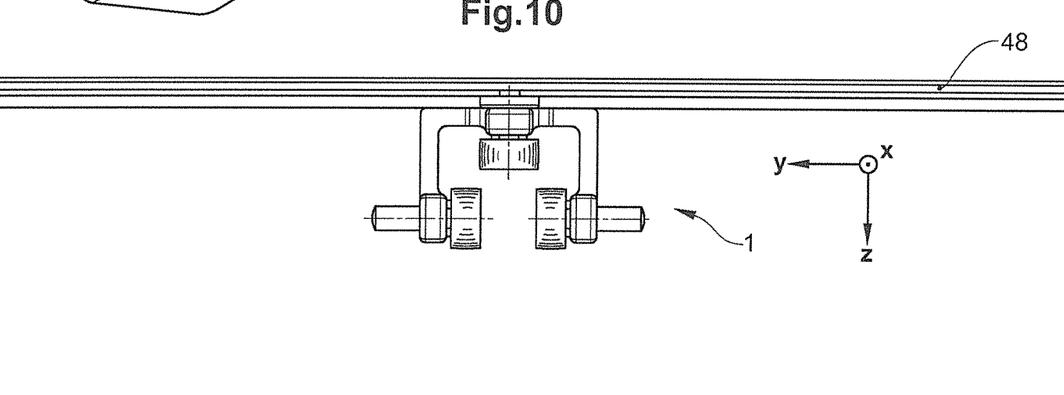
FIG. 10 shows the embodiment of FIG. 9 in a view from the front.

FIGS. 9 and 10 show an embodiment of a carriage 1 which is configured not for conveying in a suspended manner but for conveying in a supporting or carrying manner, respectively. To this end, the carriage 1 in comparison with the carriages shown in FIGS. 1 to 8 is rotated about the x-axis by 180°. A plate 48 which may serve as a support for cargo (not shown) is attached to that connection portion 3 that in the present embodiment is the upper connection portion 3.

The plate 48 herein, as is shown, may have a graduation in the z-direction.

By linking (not shown) a plurality of such carriages 1 by way of plates 48, a carriage assembly having a plate assembly that is formed from the plates 48 and that extends in the running direction may be formed. The plates 48 which are disposed on the individual carriages 1 in such an arrangement are overlapping in a manner similar to fish scales. On account thereof, a comparatively large plate assembly which extends in the running direction may be formed. In this manner, linked plate-type conveyors may also be formed.

The invention claimed is:

1. A carriage (1) for a rail-guided conveyor system, comprising
   a. a carriage body (2) which is configured for embracing a running rail (20) and which comprises a first and a second leg (4, 5) which are interconnected by a transversely extending connection portion (3), wherein
   b. the first leg (4) includes first rollers (6a,b) attached to an internal side of the first leg (4), and
   c. the second leg (5) includes second rollers (7a,b) attached to an internal side of the second leg (5), wherein the first and the second rollers (6a,b; 7a,b) are vertically disposed and
   d. the connection portion (3) includes third rollers (8a,b) attached to an internal side of the connection portion (3), wherein the third rollers (8a,b) are horizontally disposed.

2. The carriage according to claim 1, further comprising means (42) for conveying objects (43) in a suspended or supported manner attached to the connection portion (3).

3. The carriage according to claim 1, wherein the first and the second rollers (6a,b; 7a,b) are disposed in a mirror-symmetrical manner to a vertical symmetry plane (45) of the carriage (1).

4. The carriage according to claim 3, wherein the rotation axes (46) of the third rollers (8a,b) lie in a vertical symmetry plane (45) of the carriage (1).

5. The carriage according to claim 1, wherein the first and the second rollers (6a,b; 7a,b) and the third rollers (8a,b) each are provided in pairs, wherein the rollers of each pair are disposed sequentially in a running direction of the carriage (1).

6. The carriage according to claim 1, wherein the third rollers (8a,b) and the first and the second rollers (6a,b; 7a,b) have the same dimensions.

7. The carriage according to claim 1, wherein the first and the second rollers (6a,b; 7a,b) and/or the third rollers (8a,b) each comprise a roller body being injection-moulded around a ball bearing.

8. The carriage according to claim 1, wherein the first and the second rollers (6a,b; 7a,b) and the third rollers (8a,b) are releasably fastened to the carriage body (2), and are screwed to the carriage body (2).

9. The carriage according to claim 1, wherein the carriage body (2) is integrally configured.

10. The carriage according to claim 1, wherein the carriage (1) includes at least one coupling element (9a,b) for the at least temporary coupling to a device for accelerating or for uniformly moving or for braking the carriage, said coupling element (9a,b) disposed so as to outwardly protrude on the first or the second leg (4, 5) or on the connection portion (3).

11. The carriage according to claim 10, wherein the carriage (1) includes two coupling elements (9a,b) which are disposed in a mirror-symmetrical manner to a vertical symmetry plane (45).

12. The carriage according to claim 1, wherein the carriage (1) includes at least one elastically deformable buffer body (11a-d; 12a,b) for buffering any contact with a second carriage, said buffer body (11a-d; 12a,b) outwardly protruding from the carriage body (2) in a running direction of the carriage (1).

13. The carriage according to claim 12, wherein the carriage (1) includes at least one central buffer body (12a,b) which is centrally attached to the connection portion (3).

14. The carriage according to claim 1, wherein the carriage (1) includes coupling means (44) by way of which the carriage (1) may be connected to at least one other carriage so as to form a linked carriage assembly.

15. The carriage according to claim 14, wherein the carriage (1) includes at least one elastically deformable buffer body (11a-d; 12a,b) for buffering any contact with a second carriage, said buffer body (11a-d; 12a,b) outwardly protruding from the carriage body (2) in a running direction of the carriage (1), and in that the coupling means (44) are integrated in the buffer body.

16. A conveyor system comprising at least one running rail (20) and at least one carriage (1) according to claim 1, wherein the running rail (20) and the carriage (1) are mutually adapted and the running rail (20) is embraced by the carriage (1).

17. The conveyor system according to claim 16, wherein a plurality of carriages (1) are provided, in that some of the carriages (1) are configured as transportation trucks (40) and are loadable with cargo (43), and some of the carriages (1) are configured as spacer trucks (41) and are employable for ensuring a spacing between the transportation trucks (40).

18. A method for operating a conveyor system according to claim 16, wherein a plurality of carriages (1) are provided, and some of the carriages (1) are loaded with cargo (43), and some of the carriages (1) are empty and are employed for configuring a spacing between those carriages that are loaded with cargo (43).

19. The method according to claim 18, wherein the carriages (1) that are loaded with cargo (43), and the empty carriages (1) that are employed for configuring a spacing between the former are coupled to one another.

20. The method according to claim 16, wherein a plurality of carriages (1) are linked to form at least one coupled carriage assembly.

21. A method according to claim 20, wherein the load of at least one conveyed item of cargo (43) is distributed across a plurality of carriages (1) of the at least one coupled carriage assembly.

* * * * *